Patented Nov. 16, 1937

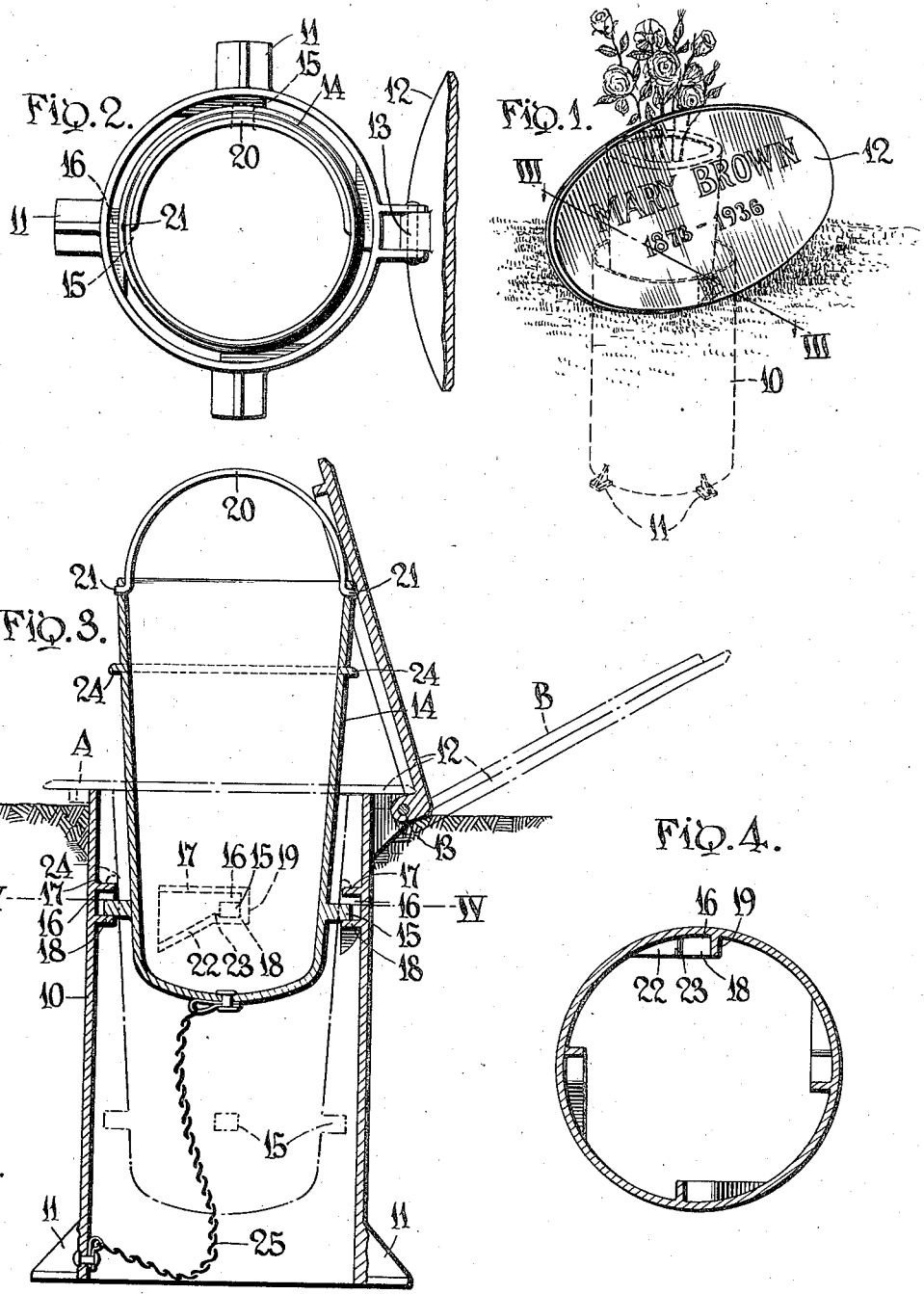

2,099,329

UNITED STATES PATENT OFFICE 2,099,329

COMBINATION GRAVE MARKER AND FLOWER HOLDER

Millard Comstock and Herbert C. Schoepflin, Buffalo, N. Y., assignors to Ornamental Specialties, Inc., Buffalo, N. Y.

Application May 19, 1936, Serial No. 80,540

3 Claims. (Cl. 47—41)

This invention relates to a combination grave marker and flower holder.

The device includes an outer casing and an inner receptacle for holding water and flowers or a potted plant. The inner receptacle may be supported either in a lowered position entirely within the outer casing or in a raised position extending partially above the top of the outer casing. A combination name plate and cover member is hingedly connected to the outer casing at its upper edge. The device is designed to be embedded in the earth to the level of the top of the outer casing member, and when the flower receptacle member is not in use and resting in its lowered position the name plate lies horizontally over the upper end of the casing member, thus providing a closure for the device and a marker for the grave which is flush with the surface of the ground. When in this position the marker does not interfere with mowing or raking across the device.

When it is desired to utilize the flower holding feature, the name plate may be swung upwardly and aside, and the flower receptacle may then be partially withdrawn from the casing and supported in a raised position, thus providing means for holding plants or flowers in an elevated position above the ground. The name plate can then be swung back to a reclining position against the flower receptacle member, thus presenting a view of the inscription which it carries in a conveniently readable position.

The invention provides means for connecting the parts of the device in such manner as to permit their relative movement while making adjustments of the flower receptacle or emptying used water therefrom, and at the same time preventing theft of any of the parts. The flower and water receptacle is constructed in such manner as to avoid breakage of the receptacle when water contained therein freezes.

The several elements of the device are constructed and arranged so as to permit free circulation of air about the flower and water receptacle which keeps the water in the receptacle relatively cool during the warm season of the year and prolongs the life of any flowers which may be resting in the receptacle.

In the accompanying drawing—

Fig. 1 is a perspective view of the device including a flower receptacle shown in a raised position and a name plate reclining against the flower receptacle;

Fig. 2 is a plan view of the device with the cover plate in its fully opened position;

Fig. 3 is a vertical section taken substantially along line III—III of Fig. 1, and showing the flower receptacle and name plate in its several positions;

Fig. 4 is a horizontal section taken substantially along line IV—IV of Fig. 3.

In practicing the invention there is provided an outer casing 10 of tubular form, open at both ends and having radial projections 11 about the base thereof for anchoring the casing in the earth to prevent its unintended or accidental displacement. A combination name plate and casing closure 12 is pivotally mounted at the upper edge of the casing by means of a hinge 13 in such manner as to lie horizontally upon the upper end of the casing and to act as a closure therefor, as illustrated in broken lines in Fig. 3.

The plate 12 may be formed in any desired decorative shape and size, and may bear any desired inscription, such as a name and dates, etc., on its upper face, as illustrated in Fig. 1. When in its closed position upon the top of the casing, it will be seen that the name plate presents its inscription upwardly and lies horizontally and substantially flush with the surface of the earth so that it will not interfere with the operation of lawn mowers or rakes.

A receptacle 14 is provided which is of such size as to fit completely within the tubular casing 12, when it is lowered to the bottom thereof. As shown in Fig. 3 the receptacle 14 is in an elevated position so that it may more readily support flowers, plants, etc. The receptacle is held in this elevated position by a number of pintles 15 projecting outwardly from the side walls of the receptacle 14. To engage the pintles 15 and support the receptacle in elevated position an equal number of pockets 16 are formed about the interior of the casing 10. The pockets 16 include upper and lower vertically spaced, horizontally extending walls 17 and 18, connected at one side by vertically extending walls 19. This leaves openings in the sides of the pockets, all facing in the same direction about the inner periphery of the casing 10, for admission of the pintles.

When it is desired to elevate the receptacle 14 it is grasped by a bail 20, which is hingedly supported in the inner wall of the receptacle through opposed pintles 21, and raised until the pintles 15 are in the approximate horizontal plane of the pockets 16 but out of radial alignment with the pockets. The receptacle is then rotated until the pintles rest in the pockets 16. With the parts formed as shown in the drawing this direction of rotation, as viewed from above, would be clockwise.

To facilitate entry of the pintles into the pocket and prevent their accidental displacement, the lower wall 18 of the pocket has a downwardly flaring lip 22 which helps to guide the pintles into the pocket, and a projection 23 which assists in retaining the pintle in the pocket.

The receptacle 14 may have, near its upper edge, a circumferential flange 24 which, when the receptacle is lowered into the casing for its elevated position, rests upon the upper walls 17 of the pockets.

A chain 25 is securely anchored to the wall of the casing 10 and to the bottom of the receptacle 14 to prevent the carrying away of the receptacle.

The receptacle 14, while generally cylindrical, is tapered and of greater diameter at its open upper end than at its closed lower end. This construction permits ice to shift upwardly when its temperature is lowered and avoids bursting of the container by the expansion of the ice.

The bail 20 is of such radius that, when lying in a horizontal plane, it is substantially concentric with the upper edge of receptacle 14, and will, as a result, offer a minimum of interference during the placing of flowers or the like into the receptacle.

Assume the receptacle to be in its lowered position with the flange 24 resting on the upper walls 17 of the pockets 16 and the cover 12 closed as shown in dotted lines at A in Fig. 3. If it is desired to prepare the device for the reception of flowers, the cover is moved to the dotted line position B and the receptacle is moved to the full line position of Fig. 3 in the manner previously described. The receptacle is thus rendered readily accessible for filling with water, flowers, plants, earth, or for any other purpose. After the receptacle has been filled as desired, the cover member 12 is moved to the full line position where the indicia on its outer face are presented to observers at a convenient angle.

When it is desired to empty water, etc., from the receptacle 14 it may be completely removed from the casing 10 within the limits of the chain 25.

It will be understood that, while a single specific embodiment has been shown and described, the invention is not to be considered as limited other than as defined in the appending claims.

What is claimed is:

1. A combined marker and flower holder comprising an outer casing, a receptacle movable up and down therein and a cover member hinged to and adapted to close the top of the casing, means on the inner wall of the casing and means on the outer wall of the receptacle designed for lateral interengagement for supporting said receptacle in an elevated position, whereby said receptacle may be manually raised to its elevated position, with the means on the casing and the means on the receptacle in relative radial misalignment, and then rotated with respect to said casing to bring said means into engagement for supporting said receptacle.

2. A combined marker and flower holder comprising an outer casing, an inner receptacle movable up and down therein and a cover member hinged to the top of the casing, said casing member having a plurality of horizontally aligned cup members projecting inwardly therefrom and open at their side edges, and said inner receptacle having outwardly projecting pintles for engagement with said cup members to support said receptacle in an elevated position.

3. A combined marker and flower holder comprising an outer casing, an inner receptacle slidable up and down therein and a cover member hinged to the top of the casing, radially extending pintles on the outer side of said receptacle and inwardly extending portions upon said outer casing member, said inwardly projecting portions having recesses for receiving said pintles to maintain said receptacle in an elevated position with respect to said casing member.

MILLARD COMSTOCK.
HERBERT C. SCHOEPFLIN.